Sept. 6, 1955     F. E. BROOKS, JR     2,717,380
ANTENNA SYSTEM FOR MEASURING LOW ELEVATION ANGLES
Filed Sept. 16, 1952     2 Sheets-Sheet 2

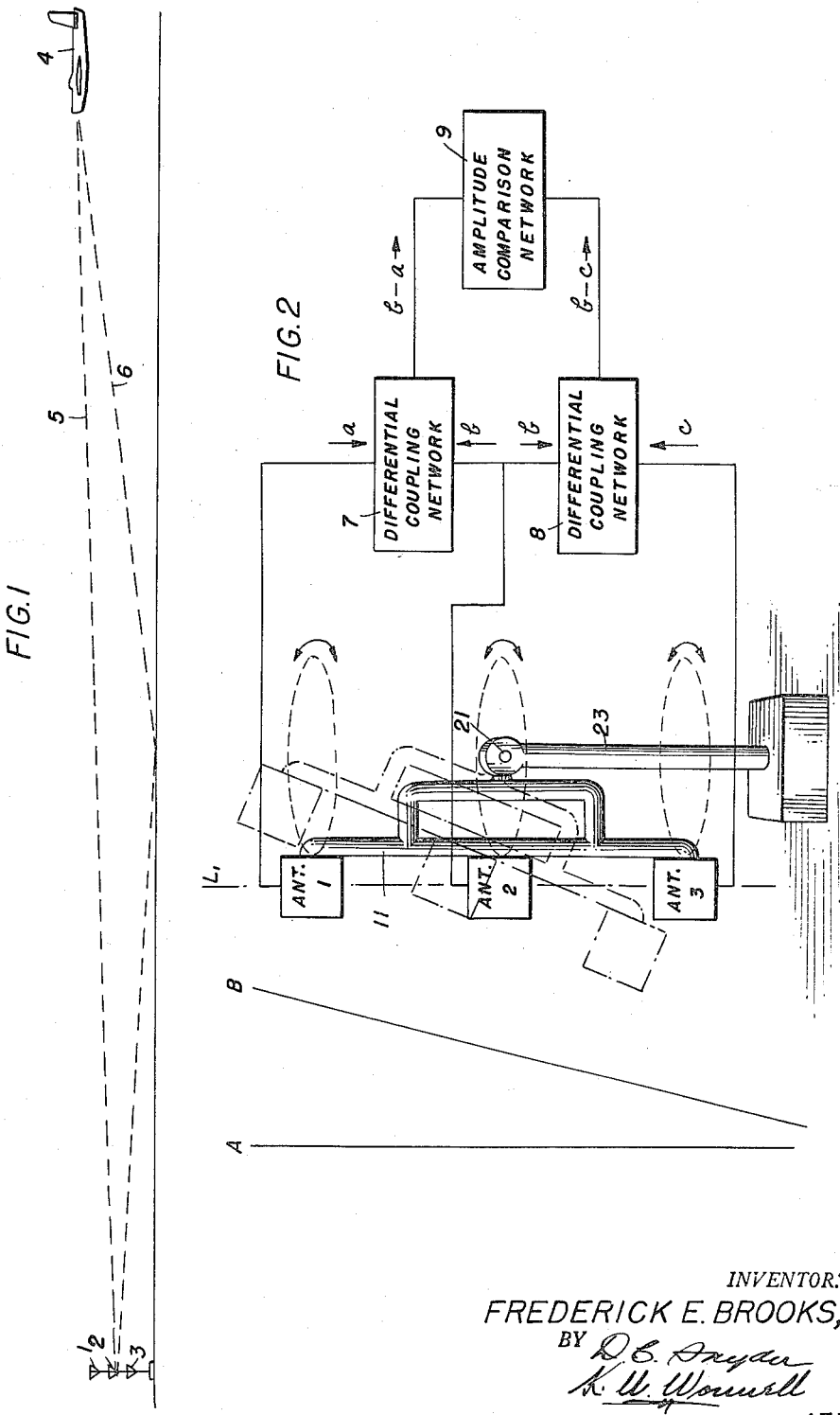

*INVENTOR:*
FREDERICK E. BROOKS, JR.
BY
*ATT'YS*

United States Patent Office 2,717,380
Patented Sept. 6, 1955

2,717,380

ANTENNA SYSTEM FOR MEASURING LOW ELEVATION ANGLES

Frederick E. Brooks, Jr., Austin, Tex., assignor, by mesne assignments, to the United States of America as represented by the Secretary of the Navy Application September 16, 1952, Serial No. 309,833

15 Claims. (Cl. 343—113)

This invention broadly relates to a method and apparatus for determining the direction of arrival of a received wave of energy. More particularly, the invention relates to a method and apparatus for determining the direction of arrival of one of two simultaneously received electromagnetic waves at the same frequency but differing in direction by a given angle.

Interference between the direct component of radio waves and the component reflected from ground or water surfaces or elevated layers has caused difficulties, especially in measuring low elevation angles to a target. Where the received wave is at a relatively high frequency, it is a simple matter to make the receiving antenna fairly directive, so that received waves from angles other than the desired angle, which differ from the desired angle by a substantial amount, are not received. The difficulty arises, for example, where one is receiving a signal originating in an aircraft flying at a low elevation angle, and it is desired to determine the elevation angle of the airplane. At these low elevation angles, the direct signal and the signal which is reflected from the ocean or other surfaces near the earth approaches the receiving antenna at a very small angular difference, so that even a directive-receiving antenna will detect both signals. The elevation angle indicated by the receiving equipment will, of course, be inaccurate, as it will be giving a result which is the simultaneous effect of both received waves.

Heretofore, the separate directions of arrival of two simultaneously received signals of the same frequency could not be accurately or conveniently measured and required complicated mathematical, computing techniques to obtain a correct result.

Accordingly, the main objective of the invention is to provide a novel radio-direction-finding system which is capable of separately measuring the direction of arrival of two received waves of the same frequency approaching the receiving antenna from two different elevation angles.

A further object of the invention is to provide a novel radio-direction-finding system capable of independently measuring the direction of arrival of two radio waves of the same frequency but approaching the receiving antenna at a very small angular difference.

A still further object of the invention is to provide a novel radio-direction-finding system capable of independently and accurately measuring the direction of arrival of two radio waves of the same frequency by means of a method and apparatus which is relatively simple to adjust and which does not require any complicated apparatus for its operation.

Another object of the invention is to provide a novel and improved radio-direction-finding system which, by means of a simple method and apparatus, can determine independently the directions of arrival of two simultaneously received waves of the same frequency but approaching the receiving apparatus from slightly different directions.

Very broadly, one feature of the invention is in providing three antennas spaced along the line which conforms to the shape of the expected, received, electromagnetic waves. One of the outside antennas and the center antenna are differentially connected, so that the difference of the signals received by the two antennas is obtained. The same differential connection is made between the center antenna and the other outside antenna, so that two voltages are obtained which indicate a vector difference of the voltages received between the center and each outside antenna. Means are provided for adjusting the position of the antennas until the amplitudes of the two latter voltages are equal. When the antennas are in this position, the line of the antennas is parallel to the wave front of one of the two received waves. When the position of the antenna is again checked to obtain a second position in which the two differentially compared voltages are equal, the antennas are then positioned in a line parallel to the wave front of the second received signal.

Other objects and features of the invention will become more apparent upon making reference to the specification to follow, the claims, and the drawings wherein:

Figure 1 is an elevational view of the direction-finding equipment and of an airplane which is transmitting radio signals which are being received by the direction-finding equipment;

Figure 2 shows a very simplified block diagram of the basic components used with the radio-direction-finding system of this invention;

Figure 3:
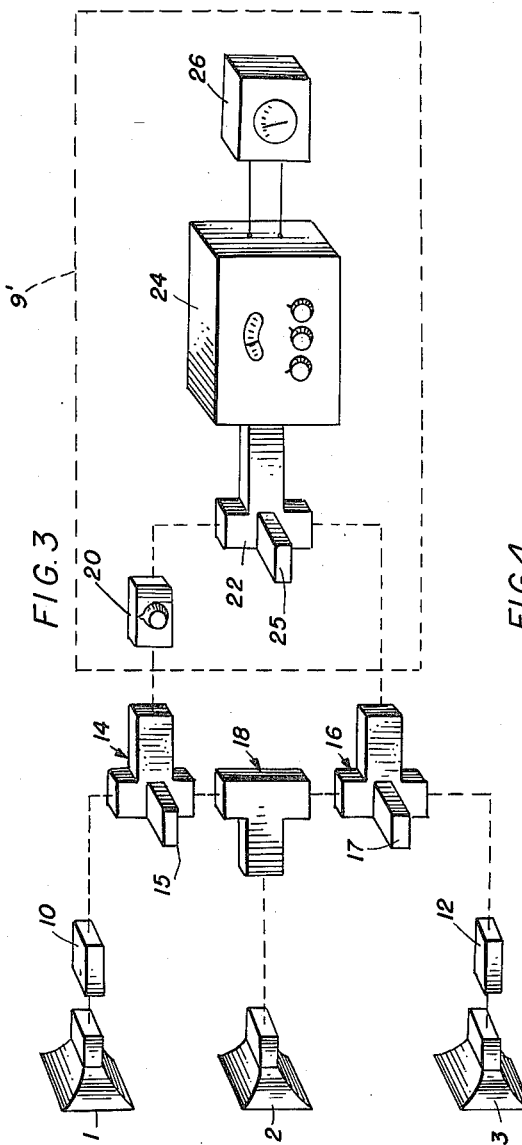
Figure 3 shows a block diagram of one exemplary and preferred embodiment of the invention.

A method and apparatus will now be described for determining the elevation angles of two simultaneously received electromagnetic waves. However, it should be understood that the broader aspects of the invention are not limited to this particular use of this invention necessarily, but also include a method and apparatus for indicating the independent direction of arrival of two radio waves in the azimuth plane or any other reference plane. In each case, however, the line along which the direction-finding antennas are placed will be understood to be in the plane in which the desired angle is to be measured.

Referring now more particularly to Figure 1, one of the major difficulties in the radio-direction-finding field has been to accurately measure the elevation angles of low-flying aircraft, such as a plane 4 in Figure 1. When the aircraft is flying at extremely low elevation angles, the difference in arrival between the direct received wave as along line 5 from the wave which is reflected from a surface along a line 6 is very small, so that even though the receiving antennas may be directive, they nevertheless receive both the direct waves along line 5 and the reflected wave along line 6. By means of the method and apparatus of the invention, three antennas 1, 2, and 3 are adjusted in azimuth and elevation, so that the amplitudes of two measured voltages are equal. In this position, the line of the antennas is parallel to the wave front of one of the received waves. The azimuth and elevation angles of the antennas are again adjusted until a second position is found where the amplitudes of two compared voltages are equal in this position. The antennas are then aligned with the wave front of the other wave.

Referring now to Figure 2, the apparatus of the invention includes three similar antenna elements, 1, 2, and 3, spaced along a line $L_1$ which conforms to the shape of the wave front of the expected oncoming wave at the antenna location. For example, if the antennas were located in the vicinity of the transmitting station, then the wave front of a received wave at the location of the three antennas would fall along a curved line. In the usual situation, however, the receiving antennas 1, 2, and 3 are located a substantial distance from the point of origin of the signals, so that the wave front extending in the vicinity of the antennas are in a straight line. An electrical connection is made from the center antenna 2 to one of the outside antennas 1 through a differential coupling network 7 to be later described, so that at the output of the coupling network 7 a resultant voltage is obtained which is the vector differences of the voltages originating from antennas 1 and 2. It is important, however, that the gain or attenuation in voltage $a$ from antenna 1 to the differential coupling network 7 be the same as the gain or attenuation in voltage $b$ from antenna 2 to the differential coupling network 7. The electrical lengths of the connections between the antennas 1 and 2 and differential coupling network 7 is preferably equal so that when antennas 1 and 2 are aligned with the wave front of a received signal, the signal components from these antennas in the output of differential coupling network originating from this signal will cancel out. Of course, the same result would occur if the electrical lengths of the connections were any multiple of wave lengths of the received signal. This, however, would make the system useful at only one frequency. In a similar manner, antenna 2 and antenna 3 are preferably coupled together by equal lengths of transmission line to a differential coupling network 8, so that at the output thereof a resultant voltage is obtained which is also the vector difference of the voltages derived from antennas 2 and 3. Here again it is important that voltages $b$ and $c$ originating from antennas 2 and 3 fed to the input of differential coupling network 8 experience the same attenuation or gain. The two voltages at the output of the differential coupling networks 7 and 8 are compared in a suitable amplitude comparison circuit 9. In a situation where the antennas 1, 2, and 3 are themselves directive along the same line, it is necessary that the antennas be adjusted both in azimuth and elevation until the voltages at the output of differential coupling networks 7 and 8 are equal. At this point, the antennas are lined parallel to the wave front of one of the two simultaneously received waves A and B. The direction of arrival of this wave has now been determined in both azimuth and elevation. By adjusting the position of the antennas in elevation, where, for example, both signals are arriving in the same azimuthal direction, a second position will be found where the voltages at the output of differential coupling networks are equal; and, in this position, the line of the antennas are in all probabilities parallel to the wave front of the second received wave. It should be apparent that the signal output from the differential coupling networks will be zero in a position where the antennas are aligned at right angles to the direction of polarization of the received wave. This may give a false indication as to azimuth or elevation depending upon the particular circumstances.

As shown in Figure 2, the antennas are rigidly connected together by an arm member 11 for simultaneous movement. Arm member 11 swivels in a vertical plane about a horizontal pivot 21 and swivels in a horizontal plane about vertical shaft member 23 which supports the entire antenna structure. By the adjustment of the arm member 11 in this manner, the connected antennas 1 and 3 for the coresponding differential coupling networks 7 and 8, which constitute the detecting elements for the directivity patterns of the two network groups, may be adjusted and relatively moved, the different angular relations may be noted and measured, and the adjustment of the detecting elements is maintained in proper relation and in unison.

The theory of operation of this system may be simply explained by stating that when the antennas 1, 2, and 3 are aligned to the wave front of one of the received waves, the phase of the signals reaching the input of differential coupling network 7 will be equal due to the equal length of line connecting it to respective antennas 1 and 3. Thus, the vector difference of the voltages induced in the antennas from the signal to which the antennas are parallel will be equal in magnitude and phase, so that their difference will be zero. The same thing occurs in connection with the voltages fed to the input of differential coupling network 8, so that the vector difference of the signal component originating from the signal to which the antenna is parallel to the wave front thereof will be zero. The only voltages remaining in the output of differential coupling networks 7 and 8 are those from the other received signal, since each antenna, 1, 2, and 3, receives the signal of the same amplitude, and the relative phases of the voltages being fed to the differential coupling network 7 are identical to those fed to differential coupling network 8. Their differences will also be identical, so that when an amplitude comparison circuit 9 coupled to the output of differential coupling networks 7 and 8 indicate voltages of the same amplitude being fed thereto, it will be apparent that the antennas are aligned parallel to one of the wave fronts of the two simultaneously received waves.

It should be understood from the theory of operation of the invention that all of the antennas 1, 2, and 3 should have similar gain characteristics, and the other circuits, such as the transmission lines coupled to the antennas and the differential coupling networks 7 and 8, should have similar gain, loss, and phase characteristics.

Reference should now be made to Figure 3 which shows one specific embodiment of the invention. In this embodiment, three antennas, 1, 2, and 3, are schematically shown arranged in a straight line. Coupled to one of the outside antennas 1 is any conventional, suitable attenuator 10, which reduces the output of antenna 1 by three db or a factor of one-half for reasons which will be hereafter explained. The outer outside antenna 3 also has coupled thereto a conventional, suitable attenuator circuit 12 which reduces signal output thereof by three db (one-half). The antennas 1, 2, and 3 are connected with equal lengths of wave guide to opposite arms of respective magic tee junctions 14 and 16. That is, center antenna 2 and antenna 1 are connected to opposite arms of a magic tee wave-guide junction 14, and antennas 2 and 3 are connected to opposite arms of a second magic tee 1 junction 16. The power from the center antenna 2 is divided by a suitable shunt tee 18. The attenuators 10 and 12 are placed in the wave-guide lines of the outside antennas 1 and 3 to cut the power in half to compensate for the power division at the shunt tee 18 for the center antenna. At the output of the series of arms of magic tees 14 and 16, the difference of the voltages fed to the input thereof is obtained. The magic tee junctions 14 and 16 and the shunt tee wave-guide junction 18 are all well-known components in the art, and it is not the intention to explain here the detailed operation of these transmission-line circuit elements. In the case of the magic tee junction, for example, the explanation thereof may be found on pages 350 and 351 of MIT Radiation Laboratory Series "Microwave Duplexers," volume 14, first edition, 1948, published by the McGraw-Hill Book Company.

It should be understood at this point, however, that there are low frequency equivalents to wave-guide circuits and wave-guide elements, such as the magic tees 14 and 16 and the shunt tee 18. For example, the hybrid coil used in telephone repeater circuits is in effect the low frequency equivalent of magic tee wave-guide elements 14 and 16.

Since, in the example shown in Figure 3, only three arms of the four-armed magic tee device are utilized, suitable dummy loads 15 and 17 are respectively connected to the unused arms of magic tees 14 and 16.

The amplitude comparison network 9' in the embodiment of Figure 3 includes a suitable phase-shifter network 20 of conventional design in the output of one of the magic tees, such as 14. Another magic tee 22 is provided having opposite input arms thereof coupled to the phase-shifter network 20 and to the output of magic tee 16 respectively. Magic tee 22 is connected to the rest of the circuit in a manner similar to magic tees 14 and 16, so that in the output thereof the vector difference of the voltages fed to the two input arms thereof is obtained. In this sense, magic tee 22 is used as a differential coupling network as are magic tees 14 and 16. A dummy load 25 is added to the unused arm of the magic tee 22. Denoting the resultant output voltage of the magic tee 14 as $E_1$ and the output of magic tee 16 as $E_2$, if an additional phase shift is added to $E_1$ equal to the angle by which $E_1$ leads or lags $E_2$, then $E_1$ and $E_2$ would cancel in the magic tee 22 for the balanced condition when the antennas are parallel to one of the received waves. This system has a disadvantage of acquiring two adjustments for a balance—the adjustment of the azimuth and elevation of the antennas 1, 2, and 3, and the adjustment of the phase shifter 20. The balance is similar in many ways to that of balancing an impedance bridge. A receiver 24 is coupled to the output arm of magic tee 22 to amplify the output thereof, and a suitable indicator device 26 is coupled to the output of the receiver 24 to aid in indicating the condition of the balanced condition (minimum or zero output of receiver 24).

An alternative adjustment procedure is available in that the phase shift required in the phase shifter 20 is uniquely specified for a given antenna system by the angular separation between the direct and the surface reflected waves, as shown by 5 and 6 of Figure 1. This relationship would allow presetting phase shifter 20 to the proper value of phase shift, related to the height of the antenna system above the reflecting surface and the tilt of the antenna system.

Figure 4:
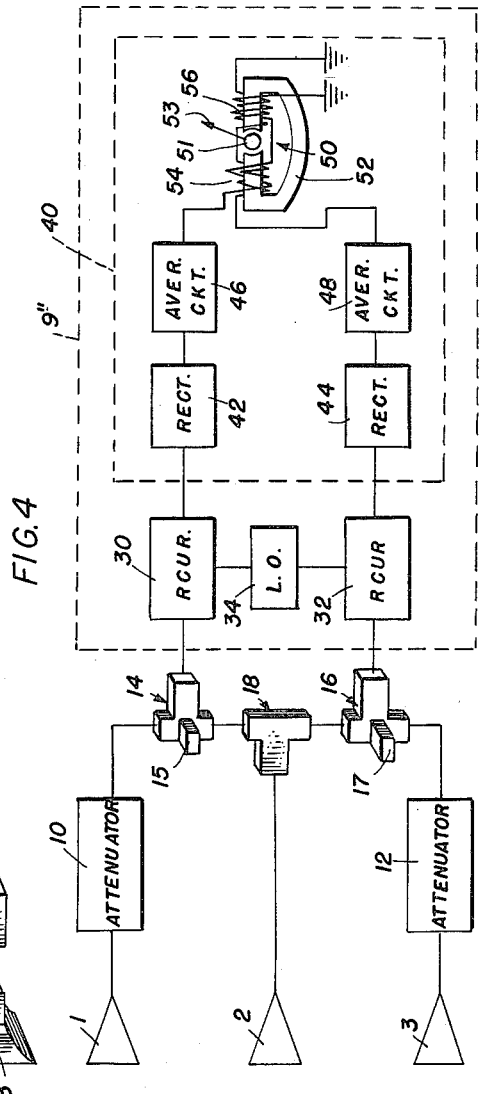
Figure 4 shows a block diagram of a second exemplary embodiment of the invention.

Referring now more particularly to Figure 4, this embodiment differs from that shown in Figure 3 in the amplitude comparison network 9''. In one sense, amplitude comparison network 9'', shown in this figure, is simpler insofar as its adjustment for balance is concerned. Separate receivers 30 and 32 of conventional design are coupled to the output of the magic tee devices 14 and 16. For convenience, a common local oscillator 34 is used for both receivers 30 and 32. These receivers merely amplify the output of the magic tee 14 and 16 which voltages represent those which amplitudes are to be compared to indicate the condition where the antennas 1, 2, and 3 are parallel to one of the wave fronts. The output of the receivers are coupled in a suitable ratio-indicating device 40 which will indicate the condition where the amplitudes of the compared voltages are equal. The ratio-indicating device 40 there shown includes rectifier devices 42 and 44 coupled to the outputs of receivers 30 and 32. Following respective rectifier devices 42 and 44 are averaging networks 46 and 48 which convert the voltage fed from rectifiers 42 and 44 to respective direct-current voltages whose magnitudes are proportional respectively to the amplitudes of the output of the rectifiers 42 and 44. Of course, it is assumed in the present example that the received radio waves are modulated as would be the case when the received signal comprises a series of radar pulses. The averaging circuits 46 and 48 may each comprise, for example, a condenser in parallel with the output of the associated rectifiers as is conventional in the art for obtaining a direct-current or average voltage from an alternating or pulsating voltage. The outputs of averaging circuits 46 and 48 are fed to a meter device 50 which includes a conventional horseshoe magnet 52 having two windings 54 and 56 which are wound about one of the arms of the magnet in opposite directions. The direct-current output of one of the averaging circuits 48 is connected to one winding 56, and the output of averaging circuit 46 is coupled to winding 54. As is conventional in most meter devices, a rotatable armature 51 of conventional design is supported between the gap in the horseshoe magnet for movement by the magnetic field passing across the gap. A pointer 53 is connected to the armature 51 and will take a position dependent on the net difference in the amplitudes of the currents flowing in the two windings 54 and 56. When the currents are equal, the pointer is placed, so that, for example, it would be in the upward position. The pointer will be to the right or to the left of the center portion depending upon which winding has the greater current passing therethrough.

The particular ratio-indicating device shown in the figure forms no part of the present invention, since any other well-known, suitable, ratio-indicating devices may be utilized to show the differences in the amplitudes between the compared voltages.

It should be apparent that receivers 30 and 32 should have identical gain characteristics.

It should also be understood that there is both a method and an apparatus aspect to this invention; that is, a novel apparatus is presented, and there is a method of utilizing this novel apparatus. The method is not dependent on the particular apparatus disclosed, because there are numerous other apparatus combinations from which the method could be practiced.

It is perfectly obvious that any existing, known mechanical devices which are rotatable along two separate axes could be used to position the antennas in azimuth and elevation. Conceivably, the antennas could be positioned by hand.

It would also be possible to produce the electrical equivalent of tilting the antennas in elevation without moving them physically, by inserting adjustable phase shifters in the lines to antenna 1 and antenna 3. These should be so coupled that as the phase is advanced in the circuit to antenna 1, which in effect shortens the line electrically, the phase shifter in the circuit to antenna 3 retards the phase and effectively lengthens the line electrically. This method of scanning a radar beam is not new and is now used in practice.

Although the antenna system shown in the drawings includes only three antenna elements 1, 2, and 3, it should be understood that the center antenna could be replaced by two similar antennas, each of which is separately associated with one of the outside antennas. This would alleviate the necessity of using attenuations 10 and 12. In the claims to follow, the center antenna element 2 is sometimes claimed as part of two groups or pairs of antennas since it has two independent functions of supplying a signal to differential coupling networks 7 and 8 which, in Figures 3 and 4, are magic tee devices 14 and 16.

This invention thus provides a novel method and apparatus for independently measuring the direction of arrival of simultaneously received, oncoming waves of the same frequency where the two waves approach from different angles.

It should be understood that numerous modifications could be made of the preferred embodiments of this invention above described without deviating from the broader, generic aspects of this invention.

For examples, the principles of the method and apparatus disclosed herein could be utilized to measure the direction of arrival of sound or acoustic-energy waves as well as radar or electromagnetic-energy waves.

I claim:

1. A direction-finding system for separately measuring the angle-of-arrival of one of two simultaneously received waves of the same frequency comprising the combination of a plurality of energy-detecting elements movable in unison in the plane in which the angle-of-arrival is to be measured and spaced along a line parallel to the wave front of the expected waves, a first pair of said energy-detecting elements differentially connected to cancel out signal components originating from a wave front to which the detecting elements are aligned, a second similar pair of energy-detecting elements differentially connected to cancel out the signal components originating from a wave front to which they are aligned, and means coupled to said two pairs of energy-detecting elements for indicating when the amplitude of the resultant output of said differentially connected pairs of energy-detecting elements are equal.

2. A direction-finding system for separately measuring the angle-of-arrival of one of two simultaneously received waves of the same frequency comprising the combination of a plurality of energy-detecting elements movable in unison in the plane in which the angle of arrival is to be measured and spaced along a line parallel to the wave front of the expected waves, first and second groups of energy-detecting elements mounted parallel to a line conforming to the shape of the wave front of the expected waves, first means coupling the first group of energy-detecting elements together to produce an output voltage which is the vector difference of the voltages received by the detecting elements of the group which difference is zero for a signal component originating from a wave front aligned with said detecting elements of the group, second means coupling the second group of detecting elements together to produce an output voltage which is the vector difference of the voltage received by the detecting elements of the second group which difference is zero for a signal component originating from a wave front aligned with the detecting elements of the group, and third means coupled to the output of said first and second means for indicating when the amplitudes of the output thereof are equal.

3. A direction-finding system for separately measuring the angle-of-arrival of one of two simultaneously received waves of the same frequency comprising the combination of a plurality of energy-detecting elements movable in unison in the plane in which the angle-of-arrival is to be measured and spaced along a line parallel to the wave front of the expected waves, first and second pair of energy-detecting elements mounted parallel to a line conforming to the shape of the wave front of the expected waves, first and second differential coupling circuits connected to the detecting elements of the first and said groups respectively by equal electrical lengths of transmission line, said transmission lines to feed signals with equal gain or loss from the associated pairs of detecting elements to the inputs of said respective differentials coupling circuits, said differential coupling circuits adapted to produce in its output a voltage which is the vector difference of the two voltages fed respectively thereto, and amplitude comparison means coupled to the output of said differential coupling means for indicating when the amplitudes of the output signals of said respective differential coupling means are equal.

4. The combination of claim 3 characterized further by said detecting elements movable together as a unit in at least the plane in which the angle-of-arrival is to be measured.

5. The combination of claim 3 characterized further by said first and second pairs of detecting elements including a common antenna element thereby requiring only three antenna elements.

6. A direction-finding system for separately measuring the angle-of-arrival of one of two simultaneously received waves of the same frequency comprising in combination of a plurality of energy-detecting elements movable in unison in the plane in which the angle-of-arrival is to be measured and spaced along a line parallel to the wave front of the expected waves, first and second pairs of energy-detecting elements mounted parallel to a line conforming to the shape of the wave front of the expected waves, first and second differential coupling circuits connected to the detecting elements of the first and said groups, respectively, by equal electrical lengths of transmission line, said transmission lines to feed signals with equal gain or loss from the associated pairs of detecting elements to the inputs of said respective differential coupling circuits, said differential coupling circuits adapted to produce in its output a voltage which is the vector difference of the two voltages fed respectively thereto, a phase-shifting device and said second differential coupling circuit adapted to produce in its output a resultant voltage equal to the vector difference of the voltages fed to the input thereof, an amplitude-indicating device coupled to the output of said third differential coupling means, and a variable control on said phase shift produced thereby for adjusting the voltage amplitude indicated by the amplitude-indicating device to a minimum.

7. The combination of claim 6 characterized further by said detecting elements movable together as a unit in at least the plane in which the angle-of-arrival is to be measured.

8. A direction-finding system for separately measuring the angle-of-arrival of one of two simultaneously received waves of the same frequency comprising the combination of three energy-detecting elements movable in unison in a plane in which the angle-of-arrival is to be measured and spaced along a line parallel to the wave front of the expected waves, a first differential coupling circuit having its input connected to the center detecting element and one of the outside detecting elements by equal electrical lengths of transmission line, a second differential coupling circuit outside antenna element by equal electrical length of transmission line, an attenuator in the said transmission lines of each of the outside detecting elements to provide equal gain or loss from the detecting elements to the respective inputs of said first and second differential coupling circuits, said differential coupling circuits adapted to produce in its output a voltage which is the vector difference of the two voltages respectively fed to the inputs thereof, and amplitude comparison circuit means coupled to the output of said differential coupling means for indicating the condition when the output signals of said respective differential coupling means are equal.

9. A direction-finding system for separately measuring the angle-of-arrival of one of two simultaneously received waves of the same frequency comprising the combination of three energy-detecting elements movable in unison in a plane in which the angle-of-arrival is to be measured and spaced along a line parallel to the wave front of the expected waves, a shunt tee waveguide junction, first and second waveguide junctions, waveguide transmission line means coupling the center detecting element to the said shunt tee junction to provide equal power outputs from two arms of the junction, respective waveguide transmission lines coupling one of the output arms of the shunt tee and one of the outside detecting elements to said first magic tee waveguide junction to produce an output in one of the arms thereof giving the vector difference of the signals fed to the input of the junction, respective waveguide transmission lines coupling the other output arms of the shunt tee and the other outside detecting element to said second waveguide junction to produce in an output in one of the arms thereof giving the vector difference of the signals fed to the input of the junction, and an attenuator in the waveguide transmission line of the outer detecting elements for reducing the power of the energy therein so that the signals arriving at the input of said magic tee junctions are equal in magnitude, the electrical lengths of the transmission line coupling the center detecting element and the two respective outer detecting elements to the said first and second magic tee junctions being equal, amplitude comparison means coupled to the output arms of said magic tee junction for indicating a condition where the amplitudes of the output signals of said magic tee junctions are equal.

10. A direction-finding system for separately measuring the angle-of-arrival of one of two simultaneously received waves of the same frequency comprising the combination of a first group of energy-detecting elements connected to provide a resultant zero output for a signal component originating from a signal having a wave front with a given predetermined relationship with said first group of detecting elements, a second group of energy-detecting elements movable with said first group and arranged similarly to said first group, and an amplitude comparison circuit means for indicating the condition where the resultant output of said first and second groups of detecting elements are equal to indicate a condition where said groups of detecting elements have said predetermined relationship with the wave front of one of the two received waves.

11. A direction-finding system for separately measuring the angle-of-arrival of one of two simultaneously received waves of the same frequency comprising the combination of a first pair of similar energy-detecting elements differentially connected to provide a resultant zero output for a signal component originating from a wave front with a given predetermined, angular relationship with said pair of detecting elements, a second pair of energy-detecting elements similar to and differentially connected like said first pair of detecting elements, said first and second pairs of detecting elements similarly aligned and movable together as a unit, and means for indicating the condition where the respective resultant outputs of said differentially connected pairs of detecting elements are equal to indicate a condition where said detecting elements have said predetermined relationship.

12. A method of determining the direction of arrival of one of two simultaneously arriving waves of the same frequency using two similar differentially connected groups of energy-detecting elements which individually provide a resultant zero output for an energy wave having a wave front with a given predetermined angular relationship with respect to the alignment of the elements of the respective groups comprising the steps of aligning said two groups of detecting elements, and then moving the two groups of detecting elements together as a unit until the finite amplitude of the resultant differential outputs of said two groups of detecting elements are equal, indicating that said groups of detecting elements have said predetermined relationship with one of the two simultaneously received waves.

13. A method of determining the direction of arrival of one of two simultaneously arriving waves of the same frequency using two similar differentially connected groups of energy-detecting elements which individually provide a resultant zero output for a wave front with a given predetermined, angular relationship with respect to the alignment of the elements of the said two groups of detecting elements, differentially coupling the resultant outputs of said differentially connected groups of detecting elements, and alternately varying the phase of the resultant signal from one of the two groups of detecting elements and simultaneously changing the angular position of the aligned groups of detecting elements until equal outputs result from said differentially coupled groups of detecting elements.

14. A direction-finding system for separately measuring the angle-of-arrival of one of two simultaneously received waves of the same frequency comprising the combination of a first group of energy-detecting elements connected to provide a resultant zero output for a signal component originating from a signal having a wave front with a given predetermined relationship with said first group of detecting elements connected and arranged similar to said first group, means for moving the directivity patterns of said first and second groups of detecting elements in unison, and an amplitude comparison circuit means for indicating the condition where the resultant output of said first and second groups of detecting elements are equal to indicate a condition where said groups of detecting elements have said predetermined relationship with the wave front of one of the two received waves.

15. A direction-finding system for separately measuring the angle-of-arrival of one of two simultaneously received waves of the same frequency comprising the combination of a first pair of similar energy-detecting elements differentially connected to provide a resultant zero output for a signal component originating from a wave front with a given predetermined, angular relationship with said pair of detecting elements, a second pair of energy-detecting elements similar to and differentially connected like said first pair of detecting elements, said first and second pairs of detecting elements similarly aligned, means for moving the directivity patterns of said first and second pairs of energy-detecting elements in unison, and means for indicating the condition where the respective resultant outputs of said differentially connected pairs of detecting elements are equal to indicate a condition where said detecting elements have said predetermined relationship.

References Cited in the file of this patent

UNITED STATES PATENTS

| Number | Name | Date |
|---|---|---|
| 1,968,068 | Blancard et al. | July 31, 1934 |
| 2,297,249 | Runge | Sept. 29, 1942 |
| 2,451,823 | Guanella | Oct. 19, 1948 |
| 2,456,666 | Agate et al. | Dec. 21, 1948 |
| 2,509,207 | Busignies | May 30, 1950 |
| 2,553,294 | Blewett | May 15, 1951 |
| 2,620,471 | Blodgett et al. | Dec. 2, 1952 |